(12) United States Patent
Guennal

(10) Patent No.: US 10,368,534 B2
(45) Date of Patent: Aug. 6, 2019

(54) FISHING LURE

(71) Applicant: FIIISH, Guipavas (FR)

(72) Inventor: Matthieu Guennal, Ploneour Lanvern (FR)

(73) Assignee: FIIISH, Guipavas (FR)

( * ) Notice: Subject to any disclaimer, the term of this patent is extended or adjusted under 35 U.S.C. 154(b) by 163 days.

(21) Appl. No.: 15/118,747

(22) PCT Filed: Feb. 13, 2015

(86) PCT No.: PCT/EP2015/053064
§ 371 (c)(1),
(2) Date: Aug. 12, 2016

(87) PCT Pub. No.: WO2015/121405
PCT Pub. Date: Aug. 20, 2015

(65) Prior Publication Data
US 2017/0042135 A1 Feb. 16, 2017

(30) Foreign Application Priority Data
Feb. 13, 2014 (FR) ..................... 14 00398

(51) Int. Cl.
*A01K 85/16* (2006.01)
*A01K 85/00* (2006.01)
*A01K 85/14* (2006.01)
(52) U.S. Cl.
CPC .............. *A01K 85/16* (2013.01); *A01K 85/00* (2013.01); *A01K 85/14* (2013.01)
(58) Field of Classification Search
CPC ......... A01K 85/00; A01K 85/16; A01K 85/14
(Continued)

(56) References Cited

U.S. PATENT DOCUMENTS 3,148,475 A * 9/1964 Goodall ................. A01K 85/16
43/42.4
3,879,882 A * 4/1975 Rask ....................... A01K 85/16
43/42.28
(Continued)

FOREIGN PATENT DOCUMENTS

FR 1 148 408 A 12/1957
FR 2 672 773 A1 8/1992
(Continued)

OTHER PUBLICATIONS

English-language translation of FR 2672773 (Year: 1992).*
International Search Report, dated Apr. 24, 2015, from corresponding PCT application.

*Primary Examiner* — Lisa L Tsang
(74) *Attorney, Agent, or Firm* — Young & Thompson

(57) ABSTRACT

A lure imitating the swimming action of a fish, includes: a rigid head consisting of a flat rear section and elements for fixing a fishing line, a hook including a shaft fixed to the rear section of the head and extending along the longitudinal axis of the lure, a flexible body extending between a front and rear end, the front end being flat and resting against the rear section of the head, the front end having a section substantially equal to the rear section, the body including a first cylindrical part extending substantially along the longitudinal axis of the lure and including a recess, and a second curved part, a baffle extending in a transverse plane relative to the body, the baffle being fixed to the rear end of the body and increasing the curvature of the second part relative to a central line of curvature of the second part.

11 Claims, 4 Drawing Sheets

(58) Field of Classification Search
USPC ............ 43/42.24, 42.28, 42.3, 42.36, 42.37, 43/42.45, 42.48
See application file for complete search history.

(56) References Cited

U.S. PATENT DOCUMENTS

| | | | | |
|---|---|---|---|---|
| D263,988 S * | 4/1982 | Williams, Jr. | ................ | D22/133 |
| 4,744,168 A * | 5/1988 | McClellan | ............. | A01K 85/00 43/42.24 |
| 5,142,811 A * | 9/1992 | Freeman | ................ | A01K 85/00 43/42.06 |
| 5,930,941 A | 8/1999 | Hayes et al. | | |
| 6,182,391 B1 | 2/2001 | Hubbard | | |
| 6,557,294 B2 * | 5/2003 | Adams | ................. | A01K 95/00 43/44.96 |
| 6,718,683 B2 * | 4/2004 | Hawkins | ................ | A01K 85/00 43/42.37 |
| 7,234,267 B1 * | 6/2007 | Konstant | ................ | A01K 85/01 43/42.24 |
| 7,627,979 B2 * | 12/2009 | Huddleston | ............ | A01K 85/00 43/42.22 |
| 7,774,974 B1 * | 8/2010 | Parks | ..................... | A01K 85/01 43/42.24 |
| 9,072,286 B1 * | 7/2015 | Rye | ......................... | A01K 85/14 |
| 2003/0192227 A1 * | 10/2003 | Stava, III | ............... | A01K 85/00 43/42.24 |
| 2008/0078114 A1 * | 4/2008 | Pack | ...................... | A01K 85/18 43/42.15 |
| 2009/0133314 A1 | 5/2009 | Mayer | | |
| 2012/0311917 A1 * | 12/2012 | Guennal | ................ | A01K 85/00 43/42.1 |

FOREIGN PATENT DOCUMENTS

| | | | | |
|---|---|---|---|---|
| FR | 2672773 A1 * | 8/1992 | ............ | A01K 85/00 |
| FR | 2 691 043 A1 | 11/1993 | | |
| GB | 2 029 181 A | 3/1980 | | |

* cited by examiner

Figure 1
(prior art)
Figure 2 (prior art)
Figure 3
(prior art)
Figure 4
Figure 5
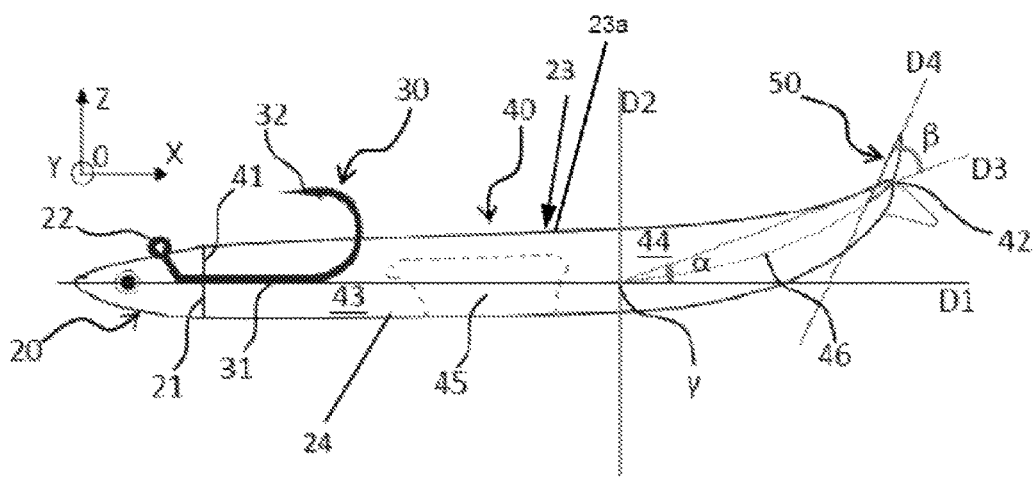
Figure 6

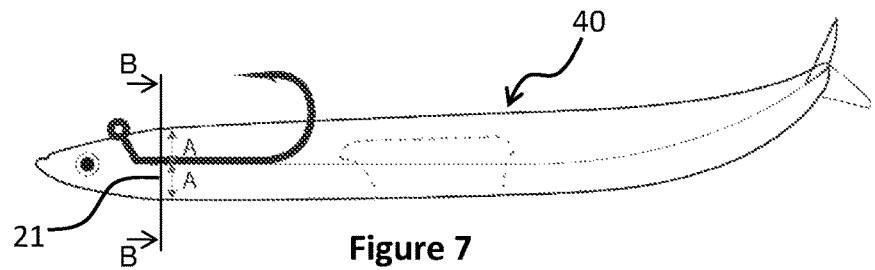
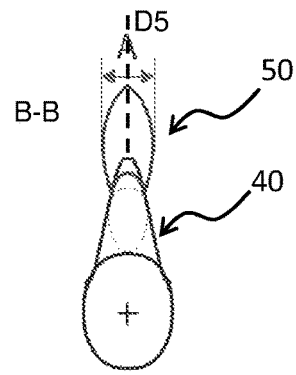
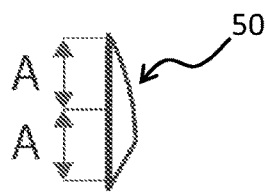
Figure 8    Figure 9
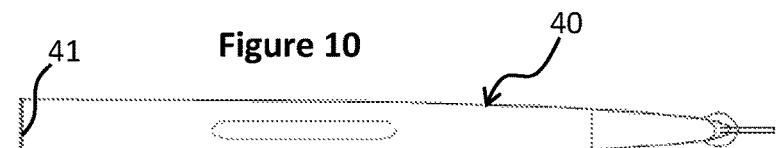
Figure 10
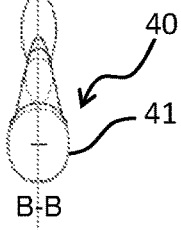
Figure 11
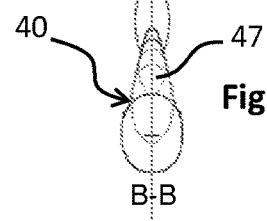
Figure 12
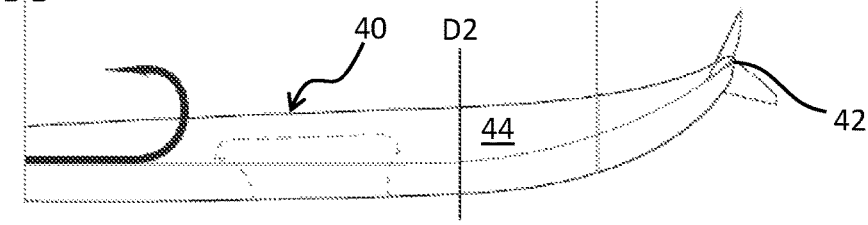
Figure 13

FISHING LURE

TECHNICAL FIELD OF THE INVENTION

The present invention relates to a fishing lure for imitating the swimming action of a fish serving as fish bait for angling.

PRIOR ART

The document GB2029181 describes a fishing lure comprising a rigid head and a body made of flexible material. This lure has an elongated shape with a flexible body which is straight except for a baffle positioned downwards. However, this lure of the prior art does not have a swimming action with a large amplitude of movement and thus does not imitate correctly the swimming action of a real fish, such as an eel, the amplitude of movement of which, from left to right or vice versa, is markedly greater.

FIG. 1, which relates to the prior art, shows a diagram of an example of a lure. The lure has a substantially straight body extending along a longitudinal axis and a baffle, or fin, directed downwards.

FIG. 2, which relates to the prior art, shows an illustration of the swimming action of a lure when it is pulled by a fishing line. The amplitude of movement of the lure is measured in the region of the baffle at the end of the flexible body furthest removed from this baffle. Said baffle prevents the lure from being pulled in a straight line and creates a left to right oscillation, which imitates the swimming action of a fish.

FIG. 3, which also relates to the prior art, illustrates the amplitude of oscillation of a lure according to the prior art. This amplitude corresponds to twice the measured length of the height of the baffle in the plane of symmetry of the lure. This figure shows a curve which descends first and then rises back up, this pattern being repeated once. According to the prior art, this amplitude is not sufficient to imitate a real fish.

OBJECT OF THE INVENTION

The object of the present invention is to overcome the drawbacks of the prior art.

For this purpose, according to a first aspect, the present invention relates to a fishing lure, which comprises:
- a rigid head consisting of a flat rear section and a means for fixing a fishing line,
- a hook comprising a shaft fixed to the rear section of the head and extending along the longitudinal axis of the lure,
- a flexible body extending between a front end and a rear end, the front end being flat and resting against said rear section of the rigid head, the front end having a cross-section substantially equal to the rear section of the rigid head,
  the flexible body comprising,
  a cylindrical first part extending substantially along the longitudinal axis of the lure and comprising a recess, and a second curved part,
- a baffle extending in a transverse plane relative to the flexible body, the baffle being fixed to the rear end of the flexible body and increasing the curvature of the second part relative to a central line of curvature of the second part of the flexible body.

Owing to these arrangements, when the user pulls the fishing line connected to the fixing means the pressure of the water forces the baffle to displace the flexible body from left to right imitating the swimming action of a live fish. The baffle modifies the direction of a liquid stream. The amplitude of the movement from left to right is increased compared to a lure having a straight flexible body and a baffle directed downwards.

Owing to the continuity of the form of the head with the flexible body it is possible to obtain a continuous hydrodynamic shape, this making it possible to imitate the swimming action of a fish.

The lure imitates the swimming action of a fish, in particular narrow long fish such as the eel. In another embodiment, the lure imitates a more compact fish such as a roach.

The rigid head is integral with the hook, the tip of which protrudes from the flexible body, thus keeping by means of gravity the lure in the correct direction.

In one embodiment, the fixing means is a ring.

In embodiments, an angle is defined in the vertical plane of the lure between the longitudinal axis of the lure and a first axis passing through:
- the point of inflection of the start of the curvature of the central line of the second part of the flexible body and
- the point of intersection between the central line of curvature of the second part of the flexible body and the rear end of the flexible body, the angle being comprised between 10 and 30°, being preferably 20°.

The inventor has discovered that the greater the angle defining the curvature, the greater the constraint and the less natural the swimming action. Inversely, the smaller the angle, the smaller the constraint and the smaller the amplitude of the swimming action.

In embodiments an angle is defined between the first axis and a second axis defined by the intersection of the vertical plane of the lure and a plane passing through the end of the baffle and parallel to the mid-plane of the baffle, the angle being comprised between 55 and 75°, being preferably 65°.

The inventor has discovered that the greater the angle defining the baffle, the greater the constraint and the less natural the swimming action. Inversely, the smaller the angle, the smaller the constraint and the smaller the amplitude of the swimming action.

In embodiments the recess comprises a rattling glass capsule.

Owing to the rattling glass capsule, the fishing lure attracts fish.

In embodiments, the length of the height of the rear section of the rigid head is equal to or greater than the length of the height of the baffle.

The inventor has discovered that the height of the baffle respecting this dimension creates a movement from left to right so as to imitate correctly the swimming action of a fish, such as an eel.

In embodiments, half the length of the height of the rear section of the rigid head is equal to or greater than the length of the width of the baffle.

The inventor has also discovered that the length of the width of the baffle respecting this dimension creates a movement from left to right so as to imitate correctly the swimming action of a fish, such as an eel.

In embodiments, the flexible body is impregnated with an appetizing product.

An appetizing product favors angling since it attracts fish. The flexible body is impregnated with an attractive composition, for example perfumed with aniseed, this attracting fish.

In embodiments the longitudinal axis separates the lure into a top part and a bottom part, the top part comprising the hook, the means for fixing the fishing line, the second part of the flexible body, the bottom part comprising the recess.

Owing to this position of the recess, the flow of the water stream does not create any turbulence, during use thereof. The hook keeps the body flexible and the curved part upwards so as to prevent the flexible body from rotating on itself.

In embodiments, the recess is situated on the lateral sides of the lure.

BRIEF DESCRIPTION OF THE FIGURES

Further advantages, aims and characteristic features of the present invention will emerge from the description which will follows, provided by way of a non-limiting explanation, with reference to the attached drawings in which:

FIG. 1 shows a side view illustration of an embodiment according to the prior art, FIG. 2, which relates to the prior art, shows a side view illustration of imitation of the swimming action of the lure according to FIG. 1 during use thereof, FIG. 3 shows a diagram of the oscillating movement of the lure according to the prior art, FIG. 4 shows a side view illustration of imitation of the swimming action of the lure during use thereof, FIG. 5 shows a diagram of the oscillating movement according to an embodiment of the fishing lure according to the present invention, FIGS. 6 and 7 show a side view of an embodiment of the fishing lure according to the present invention, FIG. 8 shows a partial view showing a baffle according to an embodiment of the lure according to the invention, FIG. 9 shows a view sectioned along the axis B-B visible in FIG. 7, FIG. 10 shows a view, from below, of an embodiment of the lure according to the invention, FIG. 11 shows a view sectioned along a plane passing through the rear section of the rigid head according to an embodiment, FIG. 12 shows a view sectioned along a transverse plane passing through the curvature of the second part of the flexible body according to an embodiment, FIG. 13 shows a view, from above, of an embodiment.

DESCRIPTION OF EXAMPLES OF EMBODIMENT OF THE INVENTION

Figure 14:
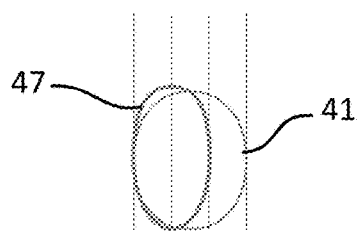
FIG. 14 shows the difference between the cross-section of the flexible body visible in FIG. 12 and the cross-section of the flexible body visible in FIG. 13.

FIGS. 1 to 3 have been described above.

FIG. 4 shows the swimming action of the lure recorded at different instants in order to observe its left-to-right movements.

FIG. 5 shows that the amplitude of the movement corresponds to the length of half of the flexible body 40, which is double the amplitude of the prior art. The oscillation of the lure is greater and forms a curve which moves down once and then rises back up, this pattern being repeated once. The inventor has discovered that this amplitude optimizes angling increasing the number of bites and catches. The movement of the lure imitates the swimming action of a real fish since the whole lure moves.

FIG. 6 shows a particular embodiment of the lure according to the invention which comprises a rigid head 20 having a rear section 21 and a means 22 for fixing a fishing line. The rigid head 20 has the form of a fish head with an eye and mouth.

The fixing means 22 is a ring which is designed to receive a fishing line inserted through it. The figure also shows the form of the hook 30: aligned straight with the eye. The tip 32 of the hook protrudes and is situated outside the flexible body 40.

The hook 30 has a shaft (straight part) 31 fixed to the rear section 21 and extending along a longitudinal axis of the lure. The hook 30 is joined to the head 20 by means of a force-fitting connection.

The lure also comprises a flexible body 40 which extends between a frontmost proximal end 41 of the flexible body 40 and a rearmost distal end 42. 5 The frontmost proximal end 41 is positioned against the rear section 21 of the rigid head 20. The rear section is a flat surface and the frontmost proximal end 41 of the flexible body 40 comprises a flat surface which coincides with the rear section 21 forming a flat-bearing connection. In this way there is no discontinuity between the rigid head 20 and the flexible body 40. The flexible body 40 includes a top portion 23 with respect to the longitudinal axis D1 and a bottom portion 24 opposite the top portion with respect to the longitudinal axis. The top portion 23 includes a topmost surface 23a of the flexible body 40.

The front end 41 has a cross-section substantially equal to the rear section 21 of the rigid head 20. In other words, the dimensions of the rear section 21 of the rigid head 20 and the front end 41 are identical so that they may rest against each other.

Still with reference to FIG. 6, a set of axes OXZ which defines the planes of the lure is shown. The plane of symmetry of the lure (plane OXZ) is perpendicular to the horizontal plane (plane OXY) and perpendicular to the transverse plane (plane OYZ). The horizontal plane merges with the longitudinal plane passing along the longitudinal axis of the lure.

The flexible body 40 comprises two parts which are separated by the straight line D2.

A cylindrical first part 43 extends substantially along the longitudinal axis of the lure and comprises a recess 45.

A second part 44 of the flexible body 40 is curved.

The flexible body 40 comprises a baffle 50 which extends in a transverse plane. The baffle 50 extends from the topmost surface 23a of the flexible body 40 at the rearmost distal end 42 of the flexible body 40. The baffle 50 is fixed to the rearmost distal end 42 of the flexible body 40 and increases the curvature of the second part 44 relative to a central line of curvature 46 of the second part 44 of the flexible body 40.

Still with reference to FIG. 6, two angles α and β are defined.

The angle α is defined in the vertical plane of the lure between the longitudinal axis of the lure and a first axis passing through:
  the point of inflection γ of the start of the curvature of the central line 46 of the second part 44 of the flexible body 40 and
  the point of intersection between the central line of curvature 46 of the second part 44 of the flexible body 40 and the rear end 42 of the flexible body 40.

As shown in this figure, the angle α is equal to 20° (comprised between 10 and 30°).

The angle β is defined between the first axis defined above and a second axis defined by the intersection of the transverse plane of the lure and a plane D5 passing through the end of the baffle 50 and parallel to the mid-plane of the baffle 50.

The second axis is defined by the intersection of the vertical plane of the lure and the mid-plane of the baffle 50. The angle β is equal to 65° (comprised between 55 and 75°).

FIGS. 7, 8 and 9 show proportions of the lure.

In FIG. 7, the reference A indicates the length of half of the rear section 21 of the lure. This figure shows the sectional plane shown in FIGS. 8, 11 and 12, indicated by B-B.

The reference A in FIG. 8 shows the width of the baffle 50 in relation to the flexible body 40. The shape of the baffle is fusiform, i.e. its shape resembles that of a spindle (elongated and rounded in the center).

FIG. 9 shows a partial view of the baffle 50. The reference A indicates the length of the height of the baffle 50. The height of the deflector 50 is defined on the one hand with the distal end of the flexible body 40 and the proximal end of the flexible body 40. The height of the baffle 50 corresponds to the height of the rear section 21 in the plane of symmetry of the lure.

FIGS. 10 to 14 show a difference in cross-section of the flexible body 40. The front end 41 of the flexible body 40 is equal to the rear section 21 of the rigid head 20. The front end 41 (equal to the rear section 21) is compared with a cross-section 47 passing through the middle point of the curvature of the second part 44 of the flexible body 40. The line of curvature starts at the point of intersection with the straight line D2 and stops at the rear end 42 of the flexible body 40.

In FIG. 14, the width of the cross-section 47 corresponds to two thirds of the width of the front end 41.

Figure 15:
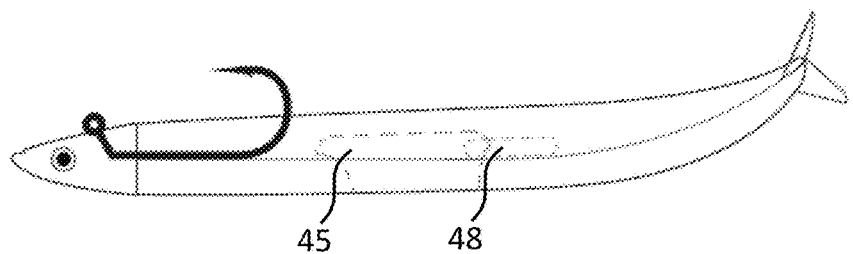
FIG. 15 shows a side view of another embodiment of the fishing lure according to the present invention.

As can be seen in FIG. 15, the recess 45 comprises a rattling glass capsule. The rattling glass capsule is positioned in the part of the recess 45 close to the second part 44 of the flexible body 40 and extends along an axis parallel to the longitudinal axis.

Figure 16:
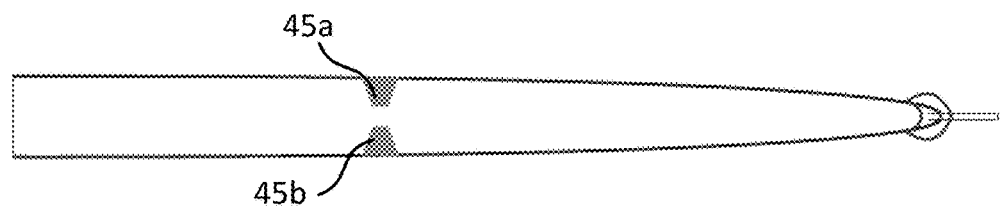
FIG. 16 shows a view, from above, of another embodiment of the fishing lure according to the present invention.

As can be seen in FIG. 16, the recesses 45a and 45b are located on the side of the lure, visible in the horizontal plane (view from above).

Figure 17:
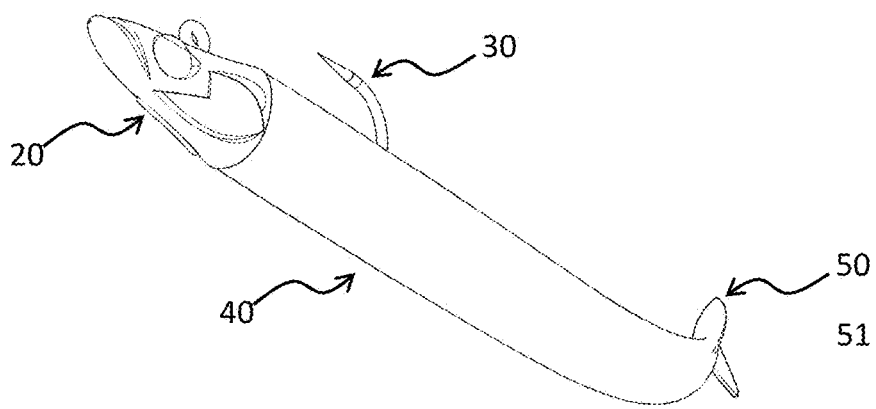
FIG. 17 shows a perspective view of an embodiment of the fishing lure according to the present invention.
Figure 18:
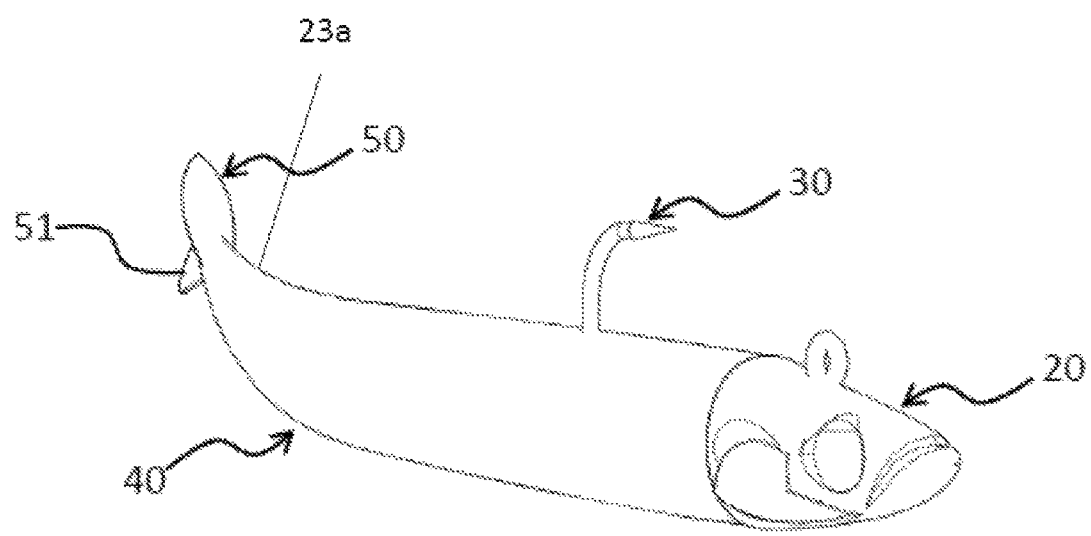
FIG. 18 shows another perspective view of an embodiment of the fishing lure according to the present invention.

FIGS. 17 and 18 show two perspective views of the lure according to an embodiment. These two figures show the rigid head 20, the hook 30, the flexible body 40 and the baffle 50.

These figures also show a fin 51 positioned below the baffle 50.

These figures also show the reproduction of a real fish's head where the head is visible with mouth, eye and gills.

LIST OF PARTS

20 rigid head
21 rear section
22 means for fixing a fishing line
30 hook
31 shaft
32 tip
40 flexible body
41 front end
42 rear end
43 first part
44 second part
45 recess
45a,45b recess on the sides of the lure
46 central line of curvature
47 cross section
48 rattling glass capsule
50 baffle
D1 longitudinal axis
D2 straight line which separates the flexible body into two parts
D3 first axis
D4 second axis

What is claimed:

1. A fishing lure for imitating a swimming action of a fish, the fishing lure comprising:
   a rigid head including a flat rear section and an attachment system configured to fix a fishing line to the fishing lure;
   a hook comprising a shaft fixed to the rear section of the head and extending along a longitudinal axis of the lure;
   a flexible body extending between a frontmost proximal end of the flexible body and a rearmost distal end opposite the frontmost proximal end, the frontmost proximal end being flat and resting against said rear section of the rigid head, the frontmost proximal end having a cross-section approximately equal to the rear section of the rigid head, the flexible body comprising a cylindrical first part extending along the longitudinal axis of the lure and including a recess, and a second curved part that curves upward with respect to the longitudinal axis, the flexible body including a top portion with respect to the longitudinal axis, the top portion including a topmost surface of the flexible body, the flexible body including a bottom portion opposite the top portion with respect to the longitudinal axis; and
   a baffle extending in a transverse plane relative to the flexible body, the baffle extending from the topmost surface of the flexible body at the rearmost distal end of the flexible body, the baffle and the second curved part of the flexible body forming a rear portion of the lure, the baffle being fixed to the rearmost distal end of the flexible body and increasing the curvature of the rear portion of the lure relative to a central line of curvature of the second curved part of the flexible body.

2. The fishing lure as claimed in claim 1, wherein a first angle is defined in a vertical plane defined with coordinates XYZ of the lure between the longitudinal axis of the lure and a first axis passing through:
   a point of inflection of a start of curvature of a central line of curvature of the second part of the flexible body, and
   a point of intersection between the central line of curvature of the second part of the flexible body and the rearmost distal end of the flexible body,
   the first angle being between 10 and 30°.

3. The fishing lure as claimed in claim 2, wherein a second angle is defined between the first axis and a second axis defined by an intersection of the vertical plane of the lure and a plane passing through an end of the baffle and parallel to a mid-plane of the baffle, the second angle being between 55 and 75°.

4. The fishing lure as claimed in claim 3, wherein the second angle defined between the first axis and the second axis is 65°.

5. The fishing lure as claimed in claim 2, wherein the first angle defined in the vertical plane of the lure between the longitudinal axis of the lure and the first axis is 20°.

6. The fishing lure as claimed in claim 1, wherein the recess comprises a rattling glass capsule.

7. The fishing lure as claimed in claim 1, wherein a length of a height of the rear section of the rigid head is equal to or greater than a length of a height of the baffle.

8. The fishing lure as claimed in claim 1, wherein half of a length of a height of the rear section of the rigid head is equal to or greater than a length of a width of the baffle.

9. The fishing lure as claimed in claim 1, wherein the flexible body is impregnated with a fish food product.

10. The fishing lure as claimed in claim 1, wherein the longitudinal axis separates the lure into a top part and a bottom part,
   the top part comprising the hook, the attachment system configured to fix the fishing line to the fishing lure, and the second part of the flexible body,
   the bottom part comprising the recess.

11. The fishing lure as claimed in claim 1, wherein the recess is situated on lateral sides of the lure.

* * * * *